United States Patent [19]

Suda

[11] Patent Number: 5,710,825

[45] Date of Patent: Jan. 20, 1998

[54] CUTTING LINE MEASURING APPARATUS

[75] Inventor: Kouichi Suda, Narashino, Japan

[73] Assignee: Seiko Seiki Kabushiki Kaisha, Japan

[21] Appl. No.: 499,160

[22] Filed: Jul. 7, 1995

[51] Int. Cl.$^6$ .............................. G06K 9/00; G06K 9/30
[52] U.S. Cl. ..................... 382/145; 382/316; 382/141
[58] Field of Search .................................. 382/141, 145, 382/149, 151, 316, 203; 348/86, 94–95

[56] References Cited

U.S. PATENT DOCUMENTS

| | | | |
|---|---|---|---|
| 5,373,150 | 12/1994 | Koike et al. | 250/202 |
| 5,384,905 | 1/1995 | Tanaka et al. | 395/143 |
| 5,412,742 | 5/1995 | Takasaki et al. | 382/316 |

*Primary Examiner*—Leo Boudreau
*Assistant Examiner*—Bhavesh Mehta
*Attorney, Agent, or Firm*—Adams & Wilks

[57] ABSTRACT

An apparatus for measuring a cutting line having a first end and a second end comprises a photographic device for photographing an image signal of the cutting line, and a processing device having a conversion function for converting the image signal of the cutting line into binary image data, first and second contour tracing functions, and a judging function. The first contour tracing function traces the contour of the cutting line from the first end to the second end of the cutting line based on the binary image data and outputs first contour tracing data corresponding to the contour of the cutting line. The second contour tracing function traces the contour of the cutting line from the second end to the first end of the cutting line based on the binary image data and outputs second contour tracing data corresponding to the contour of the cutting line. The judging function judges an abnormality in the traced contour of the cutting line by comparing the first contour tracing data to the second contour tracing data.

26 Claims, 12 Drawing Sheets

PRIOR ART

CUTTING LINE MEASURING APPARATUS

BACKGROUND OF THE INVENTION

The present invention relates to a cutting line measuring apparatus for recognizing of a semiconductor wafer and the like, particularly to an apparatus which is capable of detecting an error of a contour tracing of the cutting line and which is preferred for measuring the cutting width and the like.

Figure 9A:
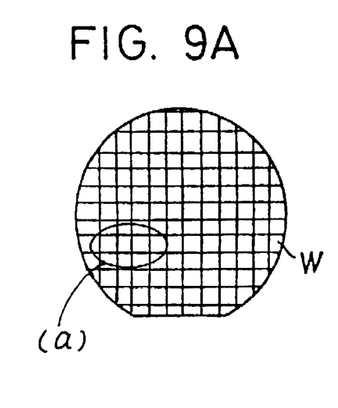
FIG. 9A is a plan view showing a semiconductor wafer.
Figure 9B:
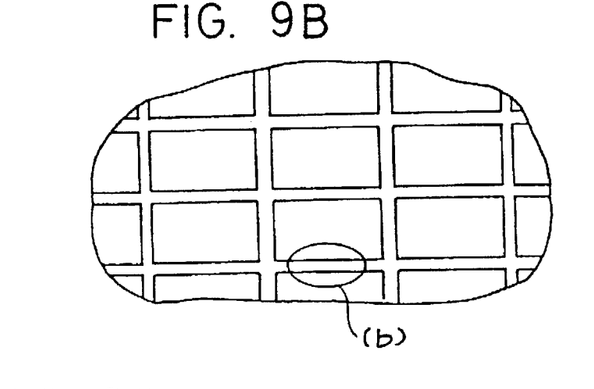
FIG. 9B is an enlarged view of portion a of FIG. 9A.
Figure 9C:
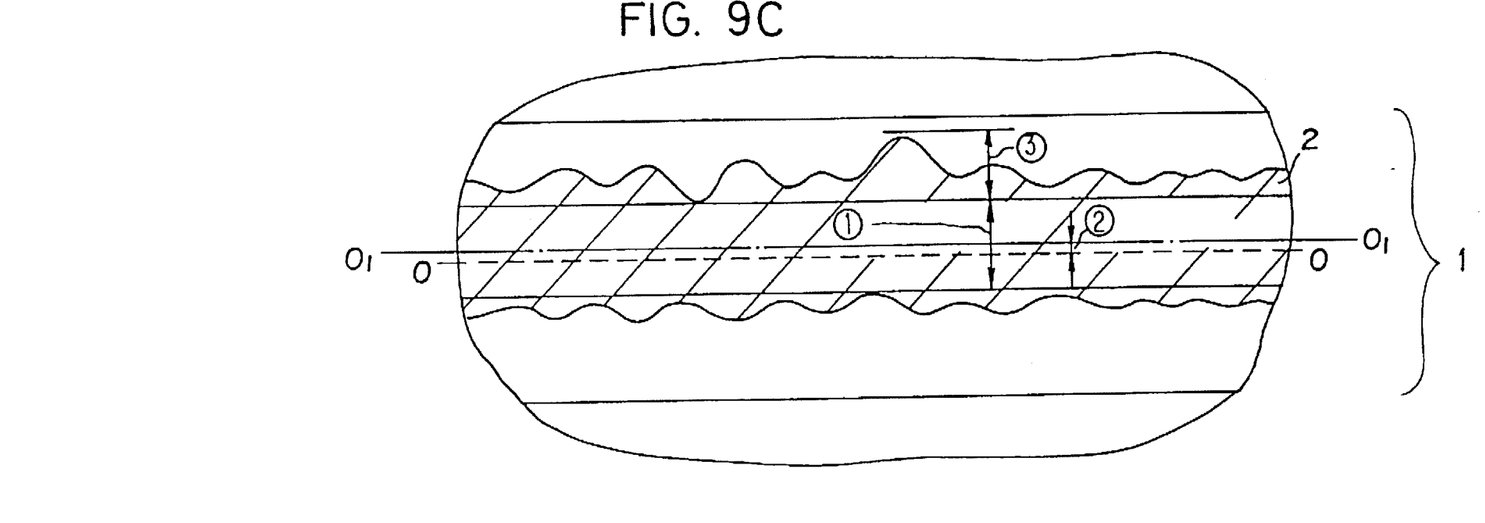
FIG. 9C is an enlarged view of portion b of FIG. 9B.

According to the dicing apparatus, in a case where the semiconductor wafer W shown in FIGS. 9A to 9C is cut at a center of a street 1 in order to separate into respective chips, the inspection as to whether or not the wafer is cut normally every time a specified number of the wafers are cut is automatically executed usually for the following three items.

(1) cutting width

It is checked whether or not a width of a cutting line 2 is within the specified dimension.

(2) center shifting

The shifting amount between the fiducial line O—O which is a center line of a street 1 and the $O_1$—$O_1$ which is a center line of the line cutting line 2 is checked. Incidentally, in a case where this shifting amount is greater than the specified value, the cutting position is corrected based on the shifting amount against the next cutting after the completion of the inspection.

(3) chipping

The chipping means a chip of the edge of the cutting line 2, and the chipping inspection is to check whether or not a chip amount of the edge of the cutting line 2 is not greater than the specified value.

The cutting line inspection apparatus executing the above mentioned inspection is comprised of a CCD camera and a microcomputer and the like, by which equipments the following treatments are executed.

Figure 10A:
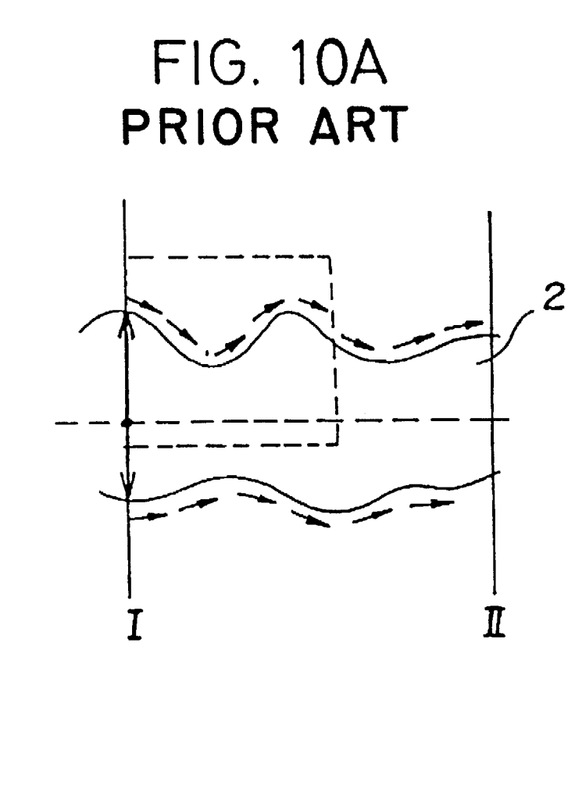
FIG. 10A is an explanatory view showing a contour tracing operation according to the prior art.
Figure 10B:
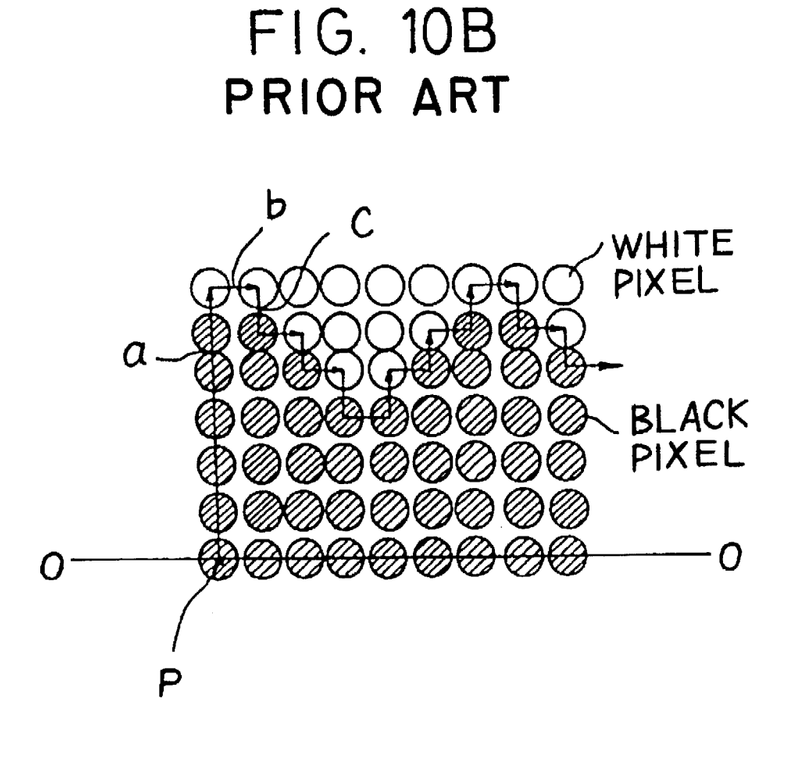
FIG. 10B is an enlarged partial view of FIG. 10A.

(a) A circumference of the cutting line is photographed by the CCD camera as shown in FIGS. 10A and 10B, thereby setting the measuring range I–II of the cutting line 2.

(b) The image signal in the measuring range I–II which is outputted from the CCD camera is taken-in to the picture image memory as the image data. This image data is stored in the picture image memory as a gray level which is of about 8 bits in brightness (for example, the values of 0 to 250 are adopted, and the black is set to 0 and the white is set to 250), and further so as to realize one-to-one correspondence to pixels of the CRT screen.

(c) Next, the image data taken-in to the image memory is binary-encoded on the basis of a threshold. That is, the image data is transformed into a binary image data representing a white and a black. On this occasion, the threshold is set in such a manner that the cutting line 2 is made into the black and the street 1 therearound is made into the white on the CRT screen. Therefore, the cutting line 2 is represented by an aggregate of black pixels and the street 1 around the cutting line 2 is represented by an aggregate of white pixels on the CRT screen after the binary-encoding. As a result, the CRT screen is made contrasty with the cutting line 2 and the street 1.

(d) After that, the contour tracing of the cutting line 2 is executed. On this occasion, the contour tracing is executed based on an algorithm by which the result is obtained relatively easy and in a short time, as compared with the strict contour tracing using a 3×3 square grid, in order to prevent the rate of operation of the dicing apparatus from decreasing. That is, assuming that an intersecting point between the fiducial line O—O which is a center line of the street 1 and a measuring range starting line I is defined as a reference point P, the contour tracing proceeds vertically and upwardly from the reference point P as shown by an arrow a while seeking the white pixel, and proceeds in a horizontal direction as shown by an arrow b in a case where it encounters the white pixel on the way thereof. And, the tracing changes a proceeding direction vertically and downwardly, and then descends until it encounters the black pixel, as shown in an arrow c, in a case where the proceeding destination in the horizontal direction is the white pixel. On the other hand, the tracing changes the proceeding direction vertically and upwardly, and then ascends until it encounters the white pixel in a case where the proceeding destination is not the white pixel but the black pixel.

Due to such a tracing, an upper edge side contour of the cutting line 2 is obtained, then the maximum value and the minimum value and the average value of the contour to the fiducial line O—O are measured based on the tracing results. Also, a lower edge side contour of the cutting line 2 is traced and measured based on an algorithm similar to the mentioned above.

However, since the prior contour tracing method described above is a relatively simple one merely for tracing the contour while executing a white-black judgment from one side of the cutting line, there are the following problems, compared with the strict contour tracing which uses a 3×3 square grid.

Figure 11:
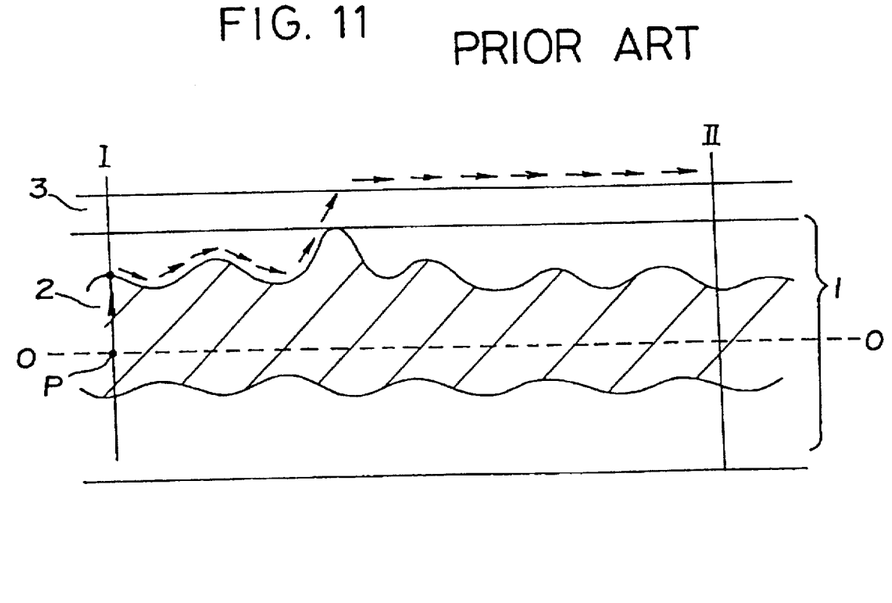
FIG. 11 is an explanatory view showing one example of the contour tracing operation according to the prior art.

(1) In a case where the cutting line 2 shifts considerably from a center line O—O of the street 1, or in a case where the cutting line 2 contacts to a wiring pattern 3 because the chipping is large as shown in FIG. 11, there are caused problems that the cutting line 2 and the wiring pattern 3 are connected to each other at the contact portion after the binary-encoding, thus the tracing of the contour moves erroneously toward the wiring pattern 3 from the contact portion, and then the tracing continues along the contour of the wiring pattern. In such a case, since the contour of the cutting line 2 cannot be measured accurately, the cutting width, the center shifting, the chipping or the like are erroneously measured.

Figure 12:
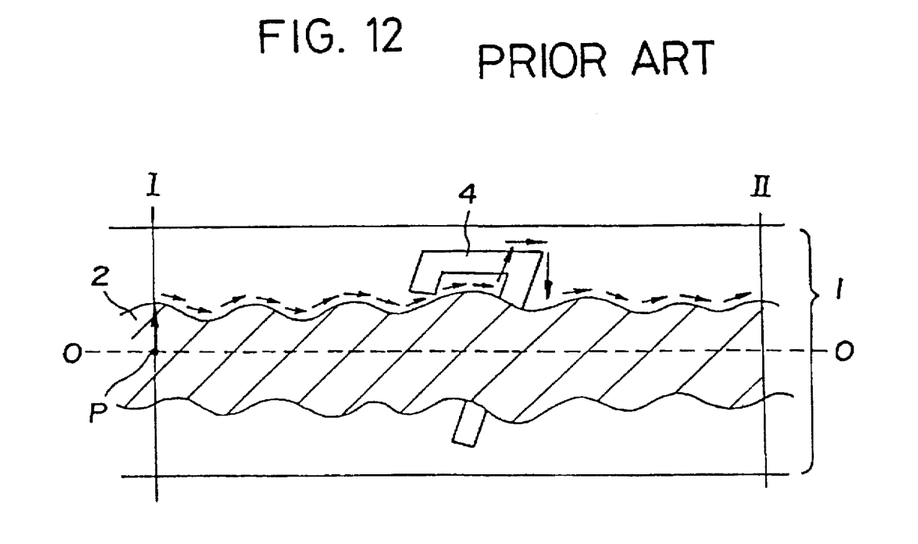
FIG. 12 is an explanatory view showing one example of the contour tracing operation according to the prior art.

(2) In a case where there exists a test pattern 4 and the like in the street 1, and the test pattern 4 and the cutting line 2 are not discriminated with each other after the binary-encoding as shown in FIG. 12, one portion of the test pattern 4 is erroneously traced as the contour of the cutting line as shown by an arrow in the drawing. Also in this case, since the contour of the cutting line 2 cannot be measured accurately, the cutting width, the center shifting, the chipping or the like are erroneously measured.

Figure 13:
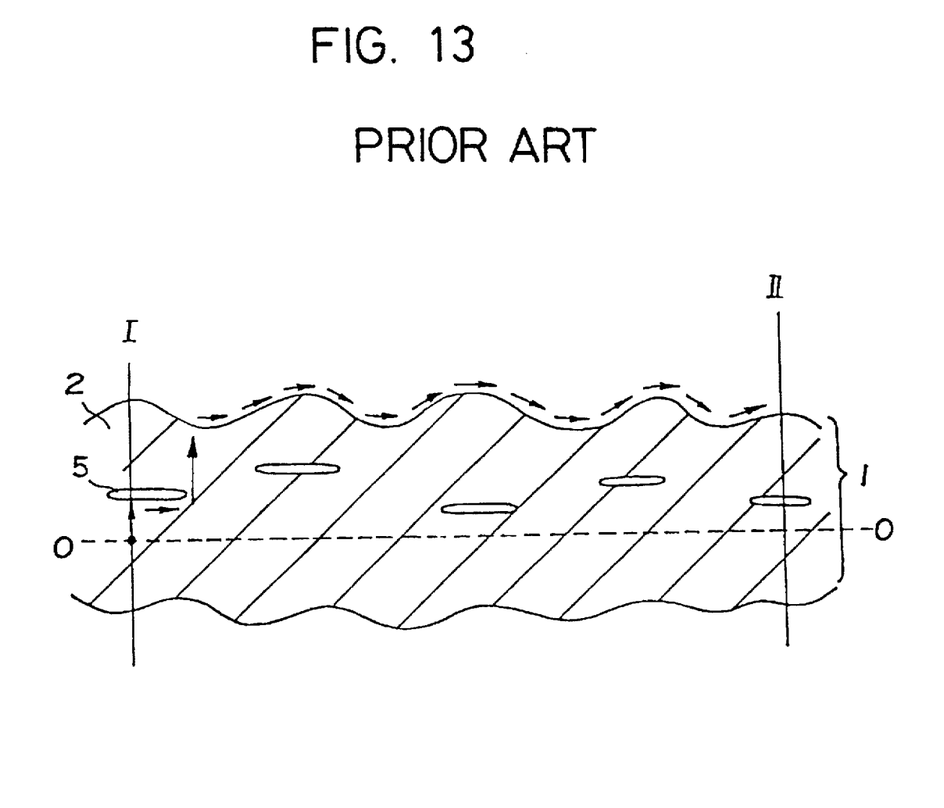
FIG. 13 is an explanatory view showing one example of the contour tracing operation according to the prior art.

(3) There is a case that a phenomenon in which a bottom of the cutting line 2 is glistened partially due to an influence of a light beam is caused in a case where the cutting is not perfect, that is, it is a half cut. If the binary-encoding is executed in such a case, white spots 5 are generated in the black cutting line 2 as shown in FIG. 13. If these white spots 5 exist on the line I of the measuring range I–II, the white spots 5 are mistaken as the edge of the cutting line 2, thereby the contour tracing proceeds as shown by the arrow in the drawing. Also, in this case, since the contour of the cutting line 2 cannot be measured accurately, the cutting width and the like is erroneously measured.

SUMMARY OF THE INVENTION

It is, therefore, an object of the present invention to provide a cutting line measuring apparatus which is capable of detecting an error of a contour tracing of a cutting line with high probability, and which is preferred for measuring a cutting width and the like.

In order to attain the above-mentioned object, the cutting line measuring apparatus comprises a photographing means for photographing a cutting line of a semiconductor wafer and the like, a range setting means for setting a measuring range of the cutting line, a data taking-in means for taking-in an image signal within the measuring range outputted from the photographing means into the picture image memory as an image data, a binary-encoding means for transforming the image data taken-in the picture image memory to the binary image data, a first contour tracing means for tracing a contour of the cutting line from one side to the other side of the cutting line based on the binary image data, a second contour tracing means for tracing the contour of the cutting line from the other side to the one side of the cutting line based on the binary image data, and a judging means for judging a correction of a contour tracing based on a comparison of a tracing result by the first contour tracing means with a tracing result by the second contour tracing means.

According to the present invention, the tracing of the contour of both sides of the cutting line is executed therefrom, and a correction of the contour tracing is judged based on a comparison of both tracing results, so that an abnormality of the contour tracing can be detected with high probability.

DETAILED DESCRIPTION OF THE PREFERRED EMBODIMENTS

An embodiment of a cutting line measuring device according to the present invention will be described hereinafter with reference to FIGS. 1 to 8.

Figure 1:
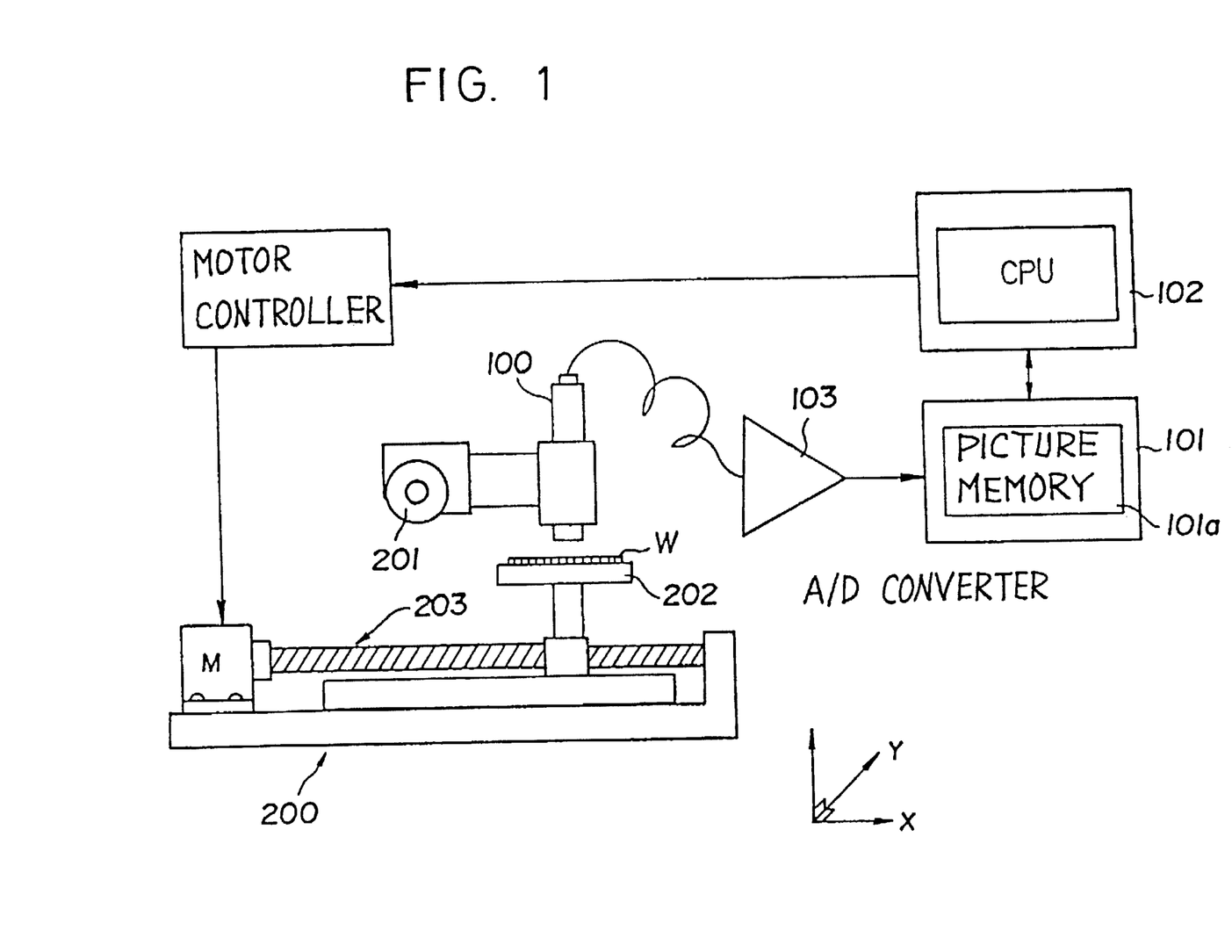
FIG. 1 is a constitutional view of a cutting line measuring apparatus according to the present invention.

The cutting line measuring device is provided with a CCD camera 100 with a microscope, a storing device 101 and a microcomputer 102 as shown in FIG. 1. The CCD camera 100 photographs a cutting line 2 of a semiconductor wafer, an image signal from the CCD camera 100 is transmitted to the storing device 101 through an A/D transmitter 103. The microcomputer 102 has a range setting function, a data taking-in function, a binary-encoding function, first and second contour tracing functions and a judging function, all as described below.

The range setting function is to set a measuring range I–II, and a width of the measuring range I–II can be changed to an appropriate necessary size.

The data taking-in function is to output data taking-in instructions for causing a picture image memory 101a to take-in as an image data an image signal in the measuring range I–II outputted from the CCD camera 100.

Moreover, the image data taken-in to the picture image memory 101a is stored as a gray level (for example, values of 0 to 255 are adopted, a black is set to 0, and a white is set to 255) of about 8-bits representing a brightness, further so as to realize a one-to-one correspondence to pixels of a CRT screen.

The binary-encoding function is to transform the image data take-in to the picture image memory 101a to a white or a black binary image data on the basis of a constant threshold.

Incidentally, this threshold is set in such a manner that the cutting line 2 becomes the black and a street 1 therearound becomes the white. Therefore, on the CRT screen after the binary-encoding function, the cutting line 2 is represented by an aggregate of black pixels, and the street 1 around the cutting line 2 is represented by an aggregate of white pixels. That is, the CRT screen is made contrasty with the cutting line 2 and the street 1.

As shown in FIGS. 2 to 7, the first contour tracing function is to trace the contour of the cutting line 2 from one side 2a to the other side 2b of the cutting line 2 on the basis of a binary image data, and the second contour tracing function is to trace the contour of the cutting line 2 from the side 2b to the side 2a of the cutting line 2.

In the end, the first contour tracing function and the second contour tracing function are different from each other in reference point from which the tracing is started. One side 2a of the cutting line 2 is defined as the reference point (hereinafter referred to as "first reference point P1") in the first contour tracing function, and the other side 2b of the cutting line 2 is defined as the reference point in the second contour tracing function (hereinafter referred to as "second reference point P2").

The first reference point P1 is located on an intersecting point of a fiducial line O—O and a line I defining a left end of the measuring range I–II, and the second reference point P2 is located on an intersecting point of the fiducial line O—O and a line II defining a right end of the measuring range I–II.

In both of the first and second tracing functions, the contour tracing is executed based on a relatively simple algorithm of tracing the contour while executing a black-and-white judgment similarly to the prior example described above. Accordingly, the detailed explanation is omitted in order to avoid the duplication.

The judging function is to judge the correction of contour tracing based on a comparison of the tracing results of the first contour tracing function and the tracing results of the second contour tracing function.

Moreover, the CCD camera 100 can move in the Y-axis direction integrally with a blade 201 of a dicing device 200, and the semiconductor wafer W is placed on a chuck table 202, and is adapted to move in the X-axis direction integrally with the chuck table 202 through a slide mechanism 203.

Next, the operation of the cutting measuring device constituted as described above will be described with references FIGS. 2 to 4.

Incidentally, they are similar to the prior art in that the image signal in the measuring range I–II outputted from the CCD camera 100 is taken-in to the picture image memory 101a as the image data that the taken-in image data is transformed into white or black binary image data, and that the cutting line 2 is represented by an aggregate of black pixels and the street 1 around the cutting line 2 is represented by an aggregate of white pixels, so that a detail explanation thereof is omitted.

Figure 2:
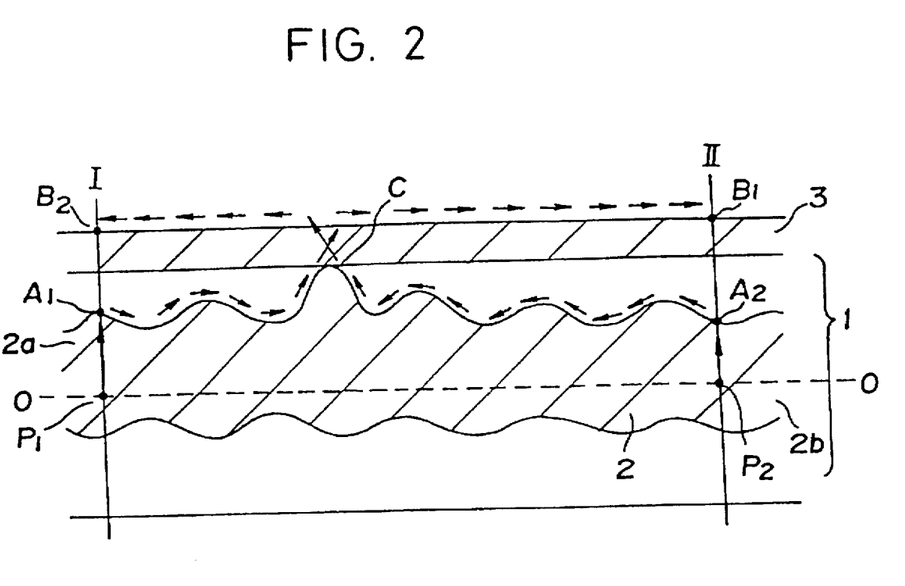
FIG. 2 is an explanatory view showing one example of a contour tracing operation in the present invention.
Figure 3:
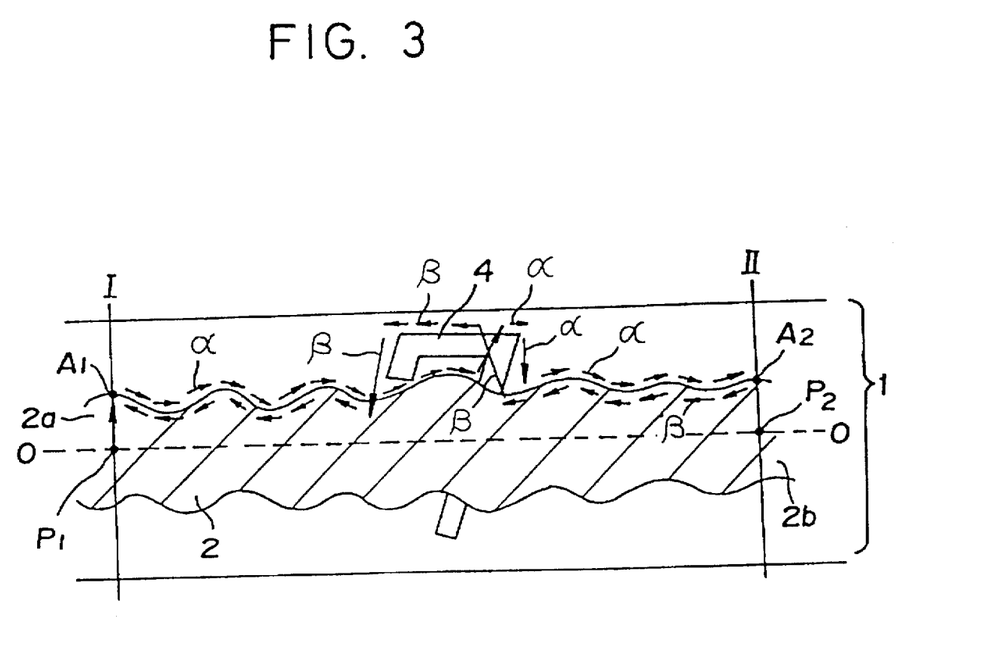
FIG. 3 is an explanatory view showing one example of a contour tracing operation in the present invention.
Figure 4:
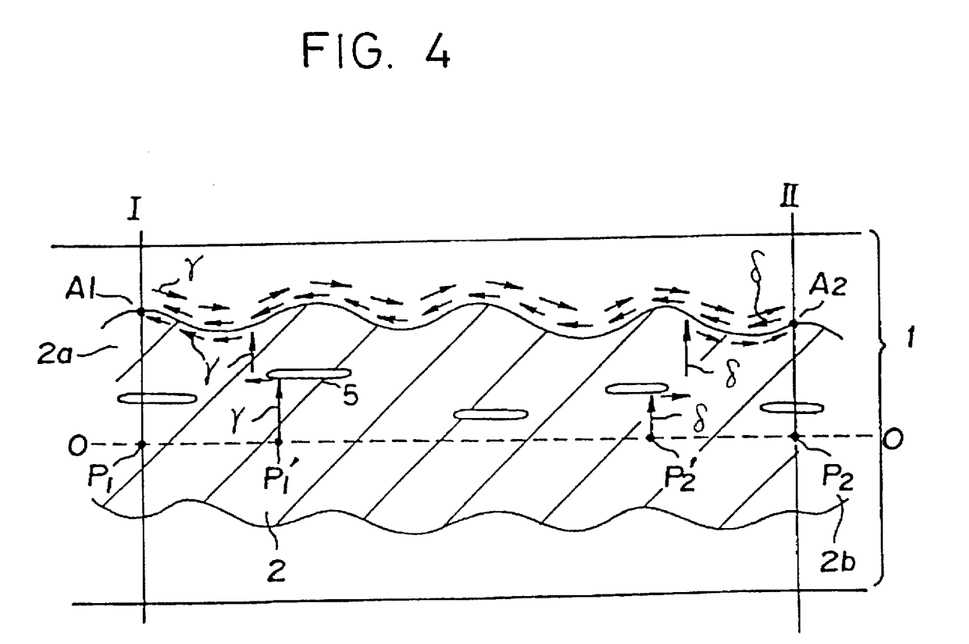
FIG. 4 is an explanatory view showing one example of a contour tracing operation in the present invention.

According to this cutting line measuring device, the first and second contour tracing functions are operated after the binary-encoding function, thereby the contour tracing from the one side 2a to the other side 2b of the cutting line is executed, and oppositely thereto, the contour tracing from the other side 2b to the one side 2a of the cutting line is executed. That is, the contour tracing is executed from both sides 2a, 2b of the cutting line 2, respectively. On this occasion, the contour tracing from the one side 2a of the cutting line is executed based on the first reference point P1, also the contour tracing from the other side 2b of the cutting line is executed based on the second reference point P2.

Next, the judging function is performed. The correction judging of the contour tracing is executed based on a comparison of the tracing results by the first contour tracing function and the tracing results by the second contour tracing function.

The correction judging of the contour tracing will be explained while separating it into the following three cases.

Incidentally, here, the point from which the contour tracing of the cutting line 2 is started due to the first contour tracing function is defined as a first tracing starting point A1, the finish point is defined as a first tracing finishing point B1, also, the point from which the contour tracing of the cutting line is started due to the second contour tracing function is defined as a second tracing starting point A2, and the finish point is defined as a second tracing finishing point B2.

(A) A case where the cutting line and a wiring pattern are contacted to each other (Refer to FIG. 2).

In this case, if the contour tracing from both sides 2a, 2b of the cutting line is correct, the following relation is to be satisfied:

$$A1=B2, A2=B1 \ldots \text{an equation} \quad (1)$$

However, in a case where the cutting line 2 and the wiring pattern 3 are contacted to each other, if binary-encoded, the cutting line 2 and the wiring pattern 3 are connected to each other at a contacting portion C thereof. Therefore, the contour tracing moves erroneously toward the wiring pattern 3 from the contacting portion, and then proceeds along a contour of the wiring pattern 3.

In the end, the contour tracing from the one side 2a of the cutting line passes through the first reference point P1, the first tracing starting point A1, the contacting point C and the first tracing finishing point B1, and the contour tracing from the other side 2b of the cutting line passes through the second reference point P2, the second tracing starting point A2, the contacting point C and the second trancing finishing point B2.

Accordingly, the first tracing starting point A1 and the second tracing finishing point B2, and the second tracing starting point A2 and the first tracing finishing point B1 do not coincide with each other, respectively. Therefore, the relation of the equation (1) is not satisfied, so that it is recognized that the contour tracing is abnormal.

Thus, the correction judging of the contour tracing is based on whether or not the relation of the equation (1) is satisfied, so it is judged that the contour tracing is abnormal in a case where the relation is not satisfied.

(B) A case where there is a test pattern in the street (Refer to FIG. 3).

Also in this case, based on the thinking similar to the case mentioned above, it is judged that the contour tracing is abnormal in a case where the first tracing starting point A1 and the second tracing finishing point B2, an the second tracing starting point A2 and the first tracing finishing point B1 do not coincide with each other, respectively.

However, in case of the above-mentioned judgment whether they coincide with each other, only the tracing starting points A1, A2, and the tracing finishing points B1, B2 come into question, so that it cannot be found out the error with respect to the contour tracing on the way between the both points thereof, for example, that one portion of the test pattern 4 is traced erroneously as the contour of the cutting line 2, as shown by an arrow α or an arrow β.

In order to find out such an error of the contour tracing, here, the contour tracing from the one side 2a of the cutting line and the contour tracing from the other side 2b of the cutting line are compared with each other, it is checked whether or not the tracing courses of both contour tracings are different from each other. In a case where the courses are different from each other, it is judged that the contour tracing is abnormal, such a judgment is executed in the following.

That is, all of the contour tracing data from both sides 2a, 2b of the cutting line is written on a data memory. This contour tracing data represents a distance from the fiducial line O—O to the contour of the cutting line 2.

After that, the contour tracing data from the one side 2a of the cutting line and the contour tracing data from the other side 2b of the cutting line are compared with each other. When there is an uncoincidence therebetween, it is considered that the tracing course thereof are different from each other, so that it is judged that the contour tracing has an abnormality.

However, when the contour tracing is normal also, there can be a case that the contour tracing data do not coincide to each other due to an overhang of a chipping and the like, so that the uncoincidence of the contour tracing data to some degree is allowed. For example, it is set to be allowed that the difference is within 3 pixels and the length is within 5 pixels.

Accordingly, the judgment that the contour tracing is abnormal is ensured in a case where the degree of the uncoincidence of the contour tracing data exceeds a predetermined allowable range.

In such a judging method, there is a case that it can not be discriminated whether or not the contour tracing is abnormal according to the kinds of the test patterns. However, since there are usually many cases that relatively complicated test patterns are written thereon, it can be detected with high probability that the contour tracing is abnormal by the use of the judging method.

(C) A case where a bottom of the cutting line lights partially (Refer to FIG. 4).

In a case where the bottom of the cutting line 2 lights partially due to an influence of a light beam, when it is binary-encoded, white spots 5 appear on the black cutting line 2 as shown in FIG. 4. There is a case that the white spots 5 exist on the lines I, II of the measuring range I–II.

On this occasion, in a case where the first and the second reference points P1, P2 are set on the lines I, II of the measuring range I–II as described above, there is caused a problem that a part of the white spots 5 is confused with an edge of the cutting line.

Accordingly, in this case, the reference points P1', P2' are set inside the measuring range I–II, and the contour tracing is executed on the basis of inside reference points P1', P2' from the both sides 2a, 2b of the cutting line.

Thus, in a case where, the reference points P1', P2' are set inside the measuring range I–II, the contour tracing from the one side 2a of the cutting line returns once to the first tracing starting point A1 while avoiding the white spots 5 from the reference point P1' as shown by an arrow γ, after that the contour tracing can be executed from the first starting point A1, also the contour tracing from the other side 2b of the cutting line returns once while avoiding the white spots 5 from the reference point P2' as shown by an arrow δ, after that the contour tracing can be executed from the second tracing starting point A2.

By adopting the inside reference points P1', P2' described above, the error measurement is considerably improved, however, there is a case that the error measurement is caused still.

Figure 5:
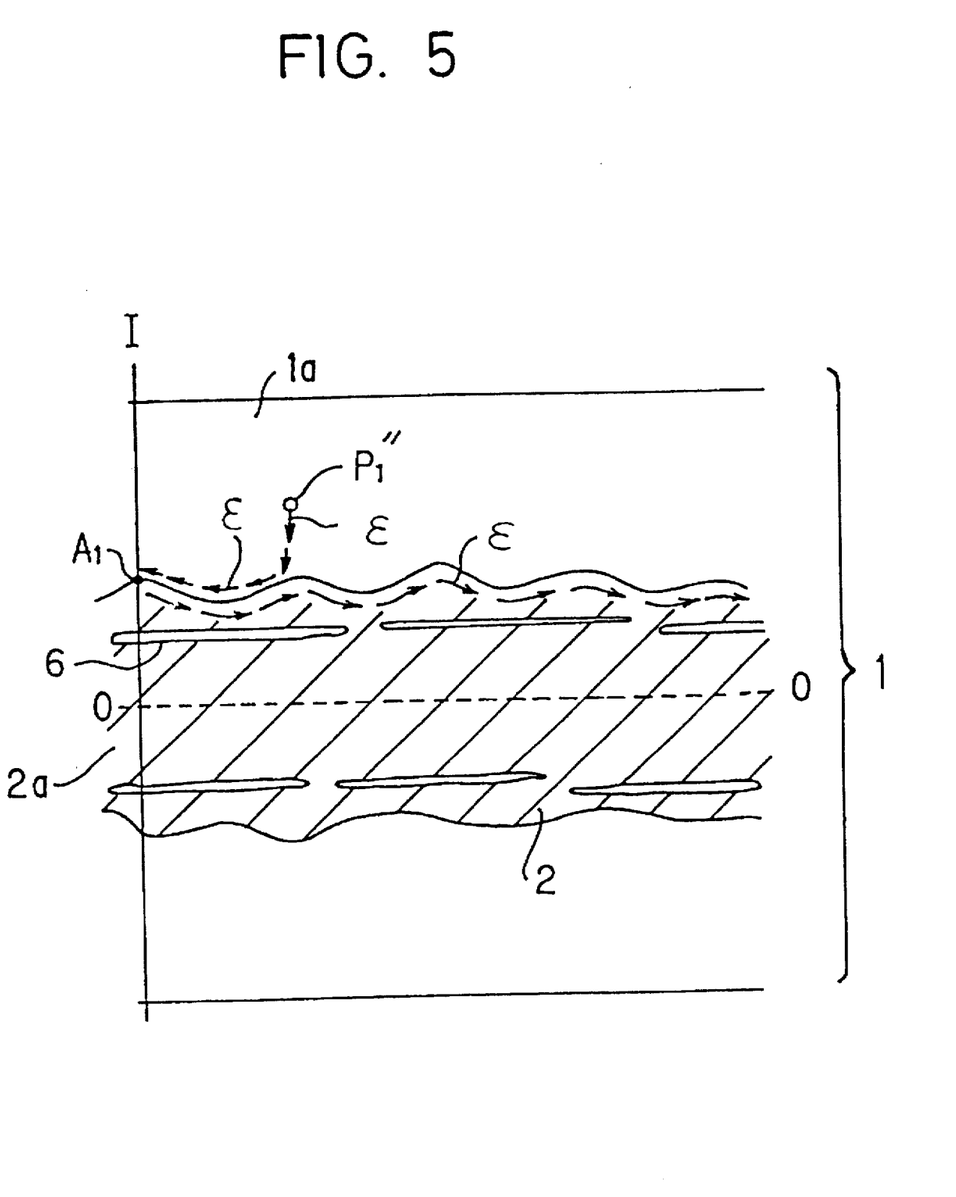
FIG. 5 is an explanatory view showing one example of a contour tracing operation in the present invention.
Figure 6:
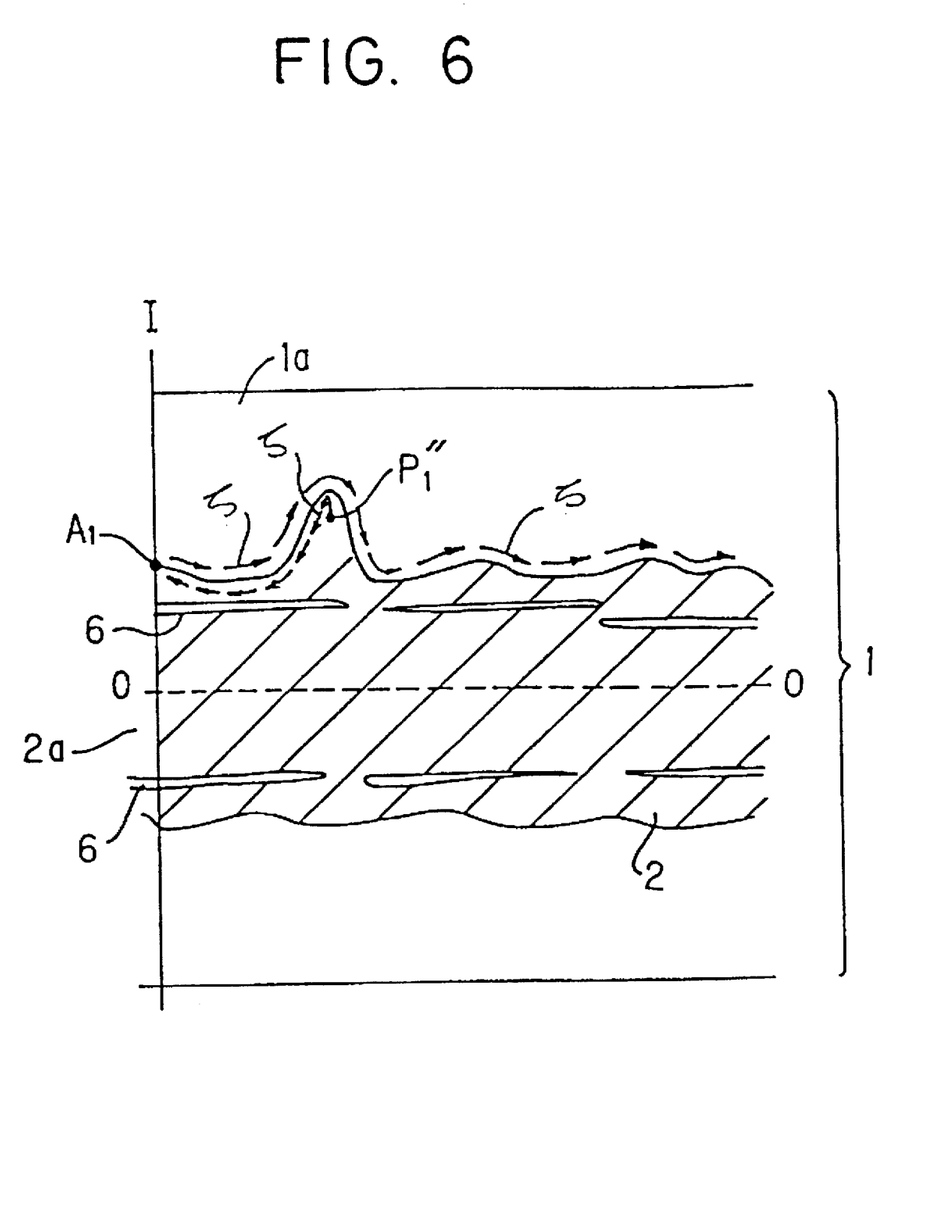
FIG. 6 is an explanatory view showing one example of a contour tracing operation in the present invention.
Figure 7:
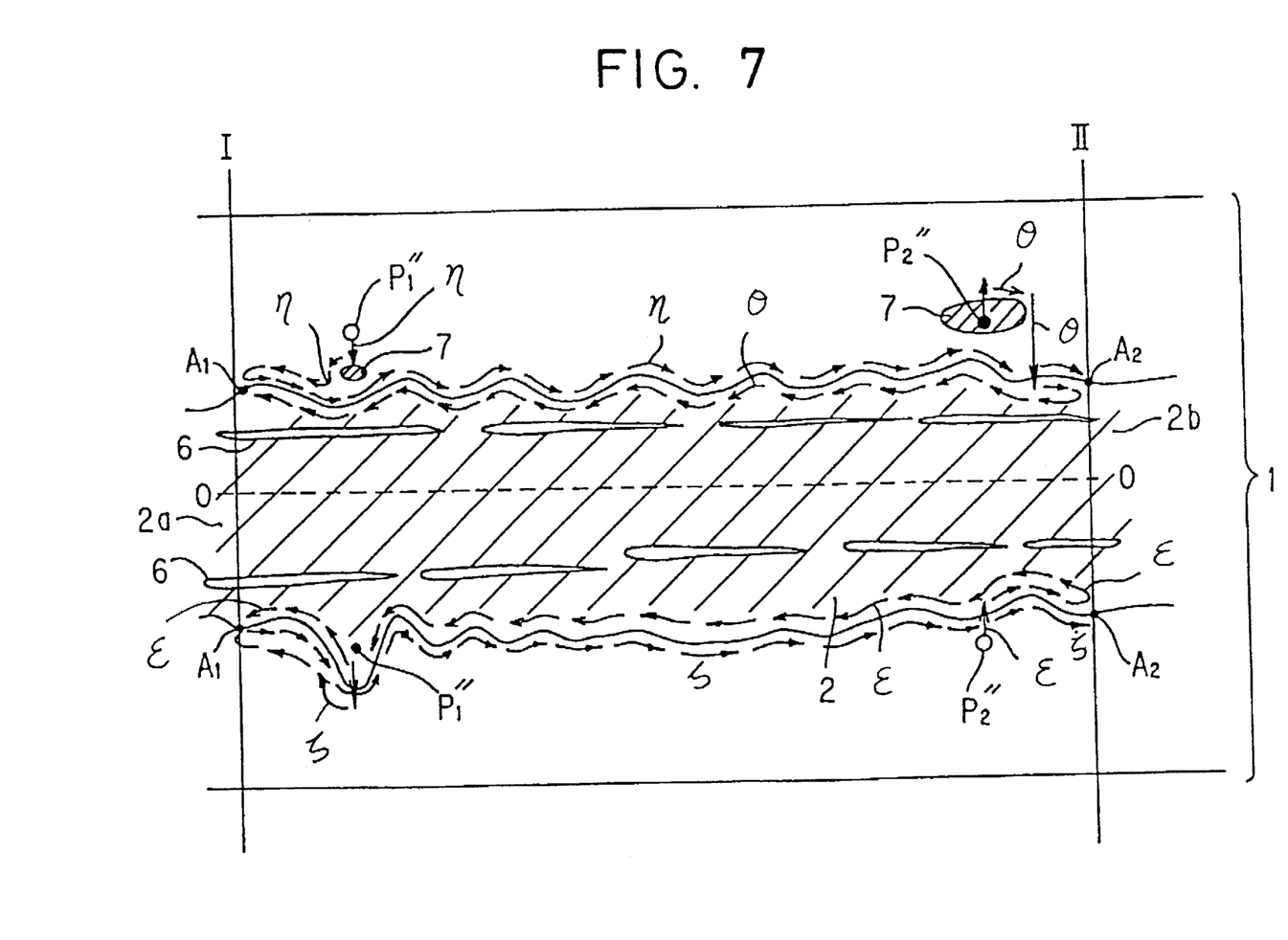
FIG. 7 is an explanatory view showing one example of a contour tracing operation in the present invention.

In the end, there is a case that the above-mentioned white spots 5 extend long in a stripe, which is made into the white line 6 superimposing on the measuring range I shown in FIGS. 5 to 7. When such a white line 6 exists on the inside reference points P1', P2', if the tracing is from the inside reference points P1', P2' similarly as mentioned above, the white line 6 is confused with the edge of the cutting line 2, so that the tracing proceeds along the white line 6 not to thereby reach the edge of the cutting line 2, as a result, the error measurement is caused.

Accordingly, in order to avoid such error measurement, the reference points P1", P2" are set not on the fiducial line O—O but are positioned apart from the fiducial line O—O, and the contour tracing of the cutting line is executed on the basis of the reference points P1", P2".

Moreover, it is preferable that the reference points P1", P2" are disposed inside the street 1 and outside the cutting line 2, that is, in a portion 1a of the street 1 which remains uncut.

Thus, in a case where the reference point P1", P2" are set at the position apart from the fiducial line O—O, when the reference point P1" is a white pixel, the tracing proceeds toward a center line (fiducial O—O) of the street 1 from the reference point P1" as shown in FIG. 5, and when the reference point P1" is a black pixel, the tracing proceeds not toward the fiducial line O—O (center line of the street 1) from the reference point P1" but toward a direction away from the fiducial line O—O as shown in FIG. 6.

For example, the tracing in case of setting the reference point P1" at a position apart form the fiducial line O—O is executed as follows.

(1) When the reference point P1" is the white pixel, the tracing proceeds downwardly and vertically toward the center line (fiducial line O—O) of the street 1 from the reference P1" until it encounters the black pixel as shown by an arrow ε in FIG. 5.

In an example shown in FIG. 5, the pixel which the tracing encounters first is the black pixel constituting the edge of the cutting line 2, and after the encounter with the black pixel, that is, the arrival on the edge of the cutting line 2, the tracing proceeds in the horizontal direction toward a side of the tracing starting point A1.

After that, the tracing proceeds vertically and downwardly when the proceeding destination is the white pixel, and the tracing proceeds in the horizontal direction when the proceeding destination is the black pixel. Thus, the tracing returns to the tracing starting point A1 once while proceeding along the edge of the cutting line 2, and the contour tracing is executed from the tracing starting point A1.

(2) When the reference point P1" is the black pixel, the tracing proceeds vertically and upwardly with respect to the fiducial line O—O from the reference point P1", that is, in the direction parting from the fiducial line O—O as shown by an arrow ζ in FIG. 6.

On this occasion, since, in an example shown in FIG. 6, the pixel which the tracing encounters first is the white pixel, the encounter with the white pixel means the arrival to the edge of the cutting line 2, so that, after the arrival, the tracing proceeds in the horizontal direction toward a side of the tracing starting point A1.

Thereafter, as mentioned above the tracing returns to the tracing starting point A1 once while proceeding along the edge of the cutting line 2, and that the contour tracing is executed from the first tracing starting point A1.

Thus, the tracing which returns from the reference point P1" to the tracing starting point A1 can be executed not only in a case where the reference point P1" is at an outside (cutting remaining portion 1a) of the cutting line 2 but also in a case where it is at an inside of the cutting line 2.

Moreover, in a case where scraps of silicon (silicon dust) is generated at the time of the cutting, a cleaning by pure water is carried out. However, the silicon dusts are not removed perfectly by only such a cleaning, so that there is a case that the silicon dust is adhered to an outside of the cutting line 2 to thereby be remained thereon. If the silicon is remained slightly, there is a case that black spots 7 are caused in a white cutting remained portion 1a which is an outside of the cutting line 2 as shown in FIG. 7 when the binary-encoding function is realized.

The tracing at the time when such black spots 7 are below the reference point P1" proceeds as shown by the arrow η in FIG. 7. That is, the tracing proceeds vertically and downwardly from the reference point P1" toward the fiducial line O—O to thereby reach the black spots 7, and then the tracing proceeds so as to outline a circumference of the black spots 7, thereby the tracing proceeds to the edge of the cutting line 2 while avoiding the black spots 7.

Also, the tracing at the time when the reference point P2" is positioned in the black spots 7 proceeds as shown by an arrow θ in FIG. 7. That is, the tracing proceeds vertically and upwardly from the reference point P2" to reach around the black spots 7, after that, it proceeds so as to outline a part of a circumference of the black spots 7, thereby, it leaves from the black spots 7 to reach the edge of the cutting line 2.

As described above, in a case where the reference points P1", P2" are set at a position parting from the fiducial line O—O, the tracing can be executed from outside the cutting line 2. Accordingly, even if the white line 6 exists in the cutting line 2, it is prevented that the white line 6 is recognized erroneously as the edge of the cutting line 2, and miss-measurement is prevented due to this kind of erroneous recognization.

The cutting line measuring apparatuses of the present embodiments each executes the contour tracing for the cutting line from both sides thereof, and judges the correction of the contour tracing based on both of the tracing results. Therefore, since the correction of the contour tracing can be judged based on both of the tracing results, the abnormality for the contour tracing can be discovered with high probability, and mis-measurement of the cutting width and the like can be prevented.

And also, the apparatus of the present embodiment is relatively so simple that the contour tracing executed from both sides of the cutting line is only to trace the contour while executing the black-and-white judgment, the processing time until the correction of the contour tracing is recognized is short, it suits to prevent the rate of the operation of the dicing apparatus from decreasing.

Figure 8:
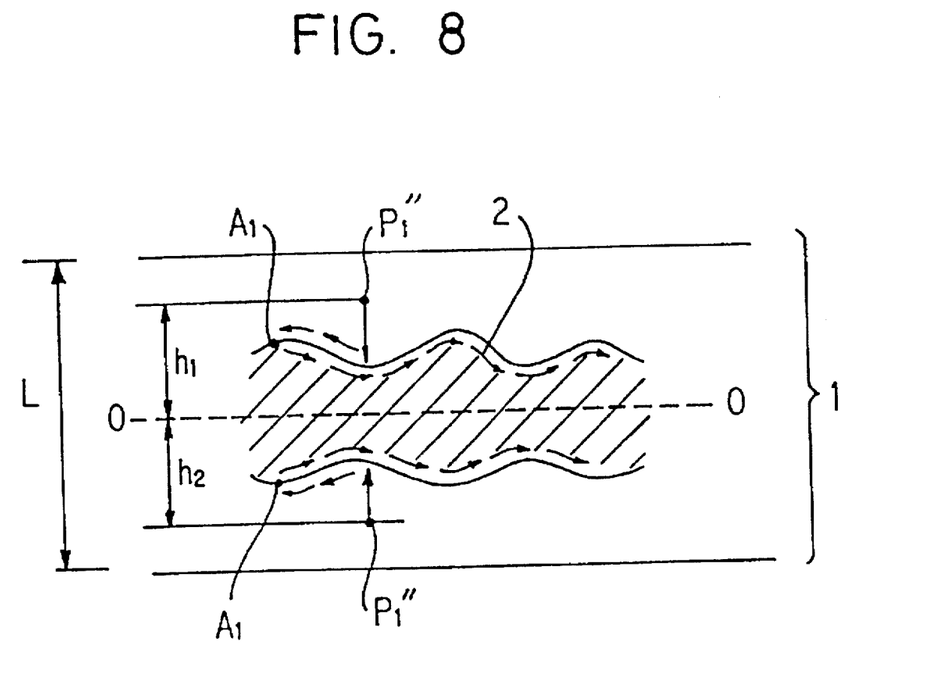
FIG. 8 is an explanatory view showing one example of a contour tracing operation in the present invention.

Moreover, as shown in FIG. 8, the distances h1, h2 from the fiducial line O—O to the reference point P1", P2" can be set as equations (2), (3) based on the relationship with a width L of the street.

$$h1<(\tfrac{1}{2})L \qquad (2)$$

$$h2<(\tfrac{1}{2})L \qquad (3)$$

There can be applied for not only the above mentioned case (C) but also the case (A), (B) to set the reference points P1', P2' inside the measuring range I–II and to set the reference points P1", P2" at the position parting from the fiducial line O—O.

The cutting line measuring apparatuses of the present embodiments each executes the contour tracing for the cutting line from both sides thereof, and judges the correction of the contour tracing based on both of the tracing results. Therefore, since the correction of the contour tracing can be judged based on both of the tracing results, the abnormality for the contour tracing can be discovered with high probability, and mis-measurement of the cutting width and the like can be prevented.

What is claimed is:

1. A cutting line measuring apparatus comprising:

photographing means for photographing a cutting line of a semiconductor wafer;

range setting means for setting a measuring range of the cutting line;

data taking-in means for taking in an image signal within the measuring range outputted from the photographing means into an image memory as an image data;

binary-encoding means for transforming the image data in the image memory into binary image data;

first contour tracing means for tracing a contour of the cutting line from one side to the other side of the cutting line based on the binary image data;

second contour tracing means for tracing the contour of the cutting line in reverse from the other side to the one side of the cutting line based on the binary image data; and judging means for judging a correction of the contour tracing based on a comparison of tracing results by the first contour tracing means with tracing results by the second contour tracing means.

2. A cutting line measuring apparatus according to claim 1; wherein a reference point for tracing the contour is set on a line for defining the measuring range.

3. A cutting line measuring apparatus according to claim 1; wherein a reference point for tracing the contour is set inside a line for defining the measuring range.

4. A cutting line measuring apparatus according to claim 1; wherein the cutting line is positioned inside a street of the semiconductor wafer, and a reference point for tracing the contour is set on a center line of the street.

5. A cutting line measuring apparatus according to claim 1; wherein the cutting line is positioned inside a street of the semiconductor wafer, and a reference point for tracing the contour is set at a position a distance from a center line of the street.

6. A cutting line measuring apparatus according to claim 5; wherein the reference point is positioned inside of the street.

7. A cutting line measuring apparatus according to claim 5; wherein the reference point is positioned inside of the street and outside of the cutting line.

8. A cutting line measuring apparatus according to claim 1; wherein the first contour tracing means includes means for tracing the contour of the cutting line from a first tracing starting point of the cutting line to a first tracing finishing point of the cutting line; and wherein the second contour tracing means includes means for tracing the contour of the cutting line from a second tracing starting point of the cutting line to a second tracing finishing point of the cutting line.

9. A cutting line measuring apparatus according to claim 8; wherein the judging means judges a correction of the contour tracing by determining whether the first tracing starting point coincides with the second tracing finishing point and determining whether the second tracing starting point coincides with the first tracing finishing point.

10. A cutting line measuring apparatus according to claim 1; further comprising storage means for storing first contour tracing data corresponding to the tracing results by the first contour tracing means and storing second contour tracing data corresponding to the tracing results by the second contour tracing means; and wherein the judging means judges a correction of the contour tracing by comparing the first contour tracing data to the second contour tracing data.

11. A cutting line measuring apparatus according to claim 10; wherein the cutting line is positioned inside a street of the semiconductor wafer; and wherein the first and second contour tracing data represent distances from a center line of the street to the contour of the cutting line.

12. A cutting line measuring apparatus according to claim 10; wherein the judging means judges whether the first contour tracing data coincides with the second contour tracing data and judges whether a degree of non-coincidence between the first and second contour tracing data exceeds a predetermined allowable range of non-coincidence.

13. An apparatus for measuring a cutting line of a semiconductor wafer, comprising:

means for generating an image signal of a cutting line of a semiconductor wafer having a plurality of semiconductor chips separated by gaps, the cutting line having a first end and a second end;

conversion means for converting the image signal of the cutting line into binary image data;

first contour measuring means for measuring a contour of the cutting line on the basis of the binary image data, the first contour measuring means including first contour tracing means for tracing the contour of the cutting line from the first end to the second end of the cutting line and outputting first contour tracing data corresponding to the contour of the cutting line;

second contour measuring means for measuring the contour of the cutting line on the basis of the binary image data, the second contour measuring means including second contour tracing means for tracing the contour of the cutting line from the second end to the first end of the cutting line and outputting second contour tracing data corresponding to the contour of the cutting line; and judging means for judging an abnormality in the contour measurement of the cutting line by comparing the first contour tracing data to the second contour tracing data.

14. A cutting line measuring apparatus according to claim 13; further comprising range setting means for setting a measuring range of the cutting line; the image signal of the cutting line converted by the conversion means being within the measuring range of the cutting line set by the range setting means.

15. A cutting line measuring apparatus according to claim 14; wherein a reference point for tracing the contour of the cutting line is set on a line defining the measuring range.

16. A cutting line measuring apparatus according to claim 14; wherein a reference point for tracing the contour of the cutting line is set inside a line defining the measuring range.

17. A cutting line measuring apparatus according to claim 13; wherein the cutting line is positioned inside one of the gaps separating the semiconductor chips of the semiconductor wafer; and wherein a reference point for tracing the contour of the cutting line is set on a center line of the gap.

18. A cutting line measuring apparatus according to claim 13; wherein the cutting line is positioned inside one of the gaps separating the semiconductor chips of the semiconductor wafer; and wherein a reference point for tracing the contour of the cutting line is set on a position at a distance from a center line of the gap.

19. A cutting line measuring apparatus according to claim 18; wherein the reference point is positioned inside of the gap.

20. A cutting line measuring apparatus according to claim 18; wherein the reference point is positioned inside of the gap and outside of the cutting line.

21. A cutting line measuring apparatus according to claim 13; wherein the first contour tracing means includes means for tracing the contour of the cutting line from a first tracing starting point of the cutting line to a first tracing finishing point of the cutting line; and wherein the second contour tracing means includes means for tracing the contour of the cutting line from a second tracing starting point of the cutting line to a second tracing finishing point of the cutting line.

22. A cutting line measuring apparatus according to claim 21; wherein the judging means judges an abnormality in the contour measurement by determining whether the first tracing starting point is coincident to the second tracing finishing point and determining whether the second tracing starting point is coincident to the first tracing finishing point.

23. A cutting line measuring apparatus according to claim 13; wherein the cutting line is positioned inside a gap of the semiconductor wafer; and wherein the first and second contour tracing data represent distances from a center line of the gap to the contour of the cutting line.

24. A cutting line measuring apparatus according to claim 13; wherein the judging means judges whether the first contour tracing data coincides with the second contour tracing data and judges whether a degree of non-coincidence between the first and second contour tracing data exceeds a predetermined allowable range of non-coincidence.

25. A cutting line measuring method, comprising the steps of:

generating an image signal of a cutting line having a first end and a second end;

converting the image signal of the cutting line into binary image data;

measuring the contour of the cutting line on the basis of the binary image data by tracing the contour of the cutting line from the first end to the second end of the cutting line and obtaining first contour tracing data corresponding to the contour of the cutting line;

measuring the contour of the cutting line on the basis of the binary image data by tracing the contour of the cutting line from the second end to the first end of the cutting line and obtaining second contour tracing data corresponding to the contour of the cutting line; and detecting whether or not there is an abnormality in the contour measurement of the cutting line by comparing the first contour tracing data to the second contour tracing data.

26. A cutting line measuring method according to claim 25; including the step of setting a measuring range of the cutting line prior to the converting step; and wherein the image signal of the cutting line converted into the binary image data is within the measuring range.

* * * * *